S. E. THOMAS.
EYEGLASSES.
APPLICATION FILED JULY 12, 1915.
1,180,341. Patented Apr. 25, 1916.
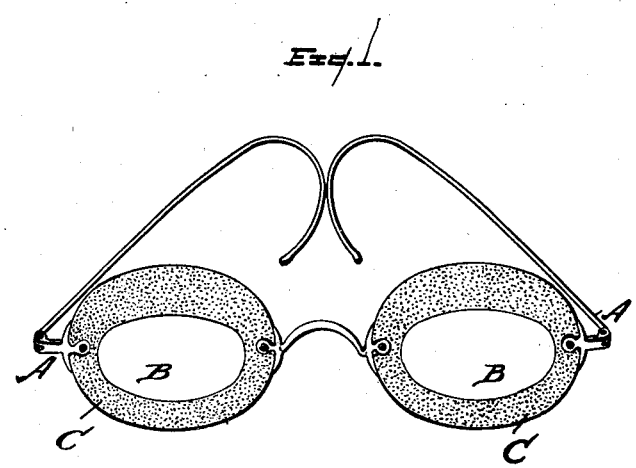
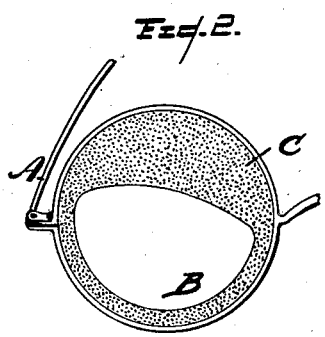
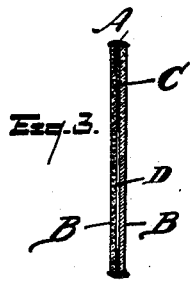
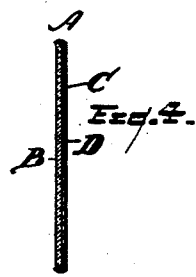
Witnesses
L. S. Woodhull
Grace Kyle.
Inventor
Samuel E. Thomas

UNITED STATES PATENT OFFICE.

SAMUEL E. THOMAS, OF DETROIT, MICHIGAN.

EYEGLASSES.

1,180,341. Specification of Letters Patent. Patented Apr. 25, 1916.

Application filed July 12, 1915. Serial No. 39,220.

*To all whom it may concern:*

Be it known that I, SAMUEL E. THOMAS, citizen of the United States, residing at Detroit, county of Wayne, State of Michigan, have invented a certain new and useful Improvement in Eyeglasses, and declare the following to be a full, clear, and exact description of the same, such as will enable others skilled in the art to which it pertains to make and use the same, reference being had to the accompanying drawings, which form a part of this specification.

My invention relates to an improvement in spectacles or goggles, shown in the accompanying drawings and more particularly set forth in the following specification and claims.

The purpose of my invention is to provide a spectacle or goggle especially designed for viewing moving pictures whereby the eyestrain complained of by many when looking at moving pictures is relieved, or entirely overcome.

One object of the invention is to provide an eyeglass or goggle, simple and inexpensive in construction in which the picture is seen through a tinted medium surrounded by a margin of relatively darker color, the object of the darker margin being to exclude from the eye extraneous light, thereby directing the center of vision through the relatively small transparent portion of the medium through which the picture or object is viewed.

Another feature of the invention consists in providing means whereby a plain tinted glass or lens may be used in combination with a translucent or transparent margin of tinted paper or other like material of deeper shade, attached to the face of the glass, or lodged between two lenses. Or a translucent or transparent margin of deep shade formed of paper or other like material may be attached to the lens providing a transparent opening of relatively lighter shade, the paper margin being coated with gelatin or other suitable transparent, water-proofing compound to protect the paper margin from accidental injury.

Another object of the invention is that "margins" may be attached to lenses of spectacles especially ground to accommodate the wearer, and either a tinted margin, or one having a ground-glass effect may be applied as desired.

Other advantages and improvements will hereafter appear.

In the drawings accompanying this specification:—Figure 1, is a perspective view embodying the invention. Fig. 2, is a fragmentary view of a modification, showing a circular lens and mounting, indicating the marginal disk applied to the lens, so that its opening is at an angle to the horizontal axis of the lens. Fig. 3, is a cross-sectional view through the lens and mounting with the paper or other marginal disk lodged between two protecting lenses;—the space which would otherwise occur at the opening being filled by a transparent medium such as gelatin. Fig. 4, is a cross-sectional view through the lens showing a modification in which the marginal disk is attached to the face of the lens, the marginal disk being coated with a transparent, water-proofing compound.

Referring now to the letters of reference placed upon the drawings:—A, denotes a spectacle frame.

B, B, lenses supported in the frame. C, an annular disk of paper or other relatively thin, transparent or translucent material, located between the lenses B, B, and secured thereto.

D, is a transparent compound covering the marginal disk and filling the opening in the marginal disk between the lenses, to provide against the entry of dust or other foreign matter.

In the modification shown in Fig. 4, the transparent coating is preferably of a waterproof character, and covers the paper margin, filling the opening therein flush with the surface of the margin.

While the openings shown in the marginal disk exposing the lenses have been found very desirable in practice, it is obvious that the "opening" may be rectilinear or any other desired shape, or the transparent opening may be adjacent to the edge of the lens if desired, without departing from the spirit of my invention. It is also apparent that instead of using a marginal disk of relatively darker tint, the margin may be of such character as to give a ground-glass effect to the lens, and by this means reduce the cost of manufacturing spectacles or goggles in which a margin of this character is desired. In putting my invention into effect, I prefer to employ lenses having a green tint with a paper or other margin of correspondingly deeper shade, that color being more restful to the eye; however, amber or any other tint may be employed if desired. I have described the marginal disks as being formed of paper, but it will be obvious that gelatin or other suitable material may be employed if desired.

Having thus described my invention what I claim is:—

1. In a device of the character described, a lens, an annular disk formed of translucent material attached to said lens, and a protecting transparent coating covering said annular disk.

2. In a device of the character described, a lens, an annular disk formed of translucent material attached to said lens, and a protecting transparent coating covering said annular disk and filling the opening in said disk flush with its surface.

3. In a device of the character described, a pair of lenses, an annular disk formed of translucent material located between said lenses, and a protecting transparent coating covering said annular disk and filling the opening in said disk between the lenses.

In testimony whereof, I sign this specification in the presence of two witnesses.

SAMUEL E. THOMAS.

Witnesses:
 L. S. WOODHULL,
 GRACE KYLE.